United States Patent [19]
Kellam

[11] Patent Number: 5,664,892
[45] Date of Patent: Sep. 9, 1997

[54] SPRING LEG MOUNTING AND SPRING CUP RECEIVER

[75] Inventor: David Kellam, Stratford, Canada

[73] Assignee: FAG Automobiltechnik AG, Germany

[21] Appl. No.: 635,466

[22] Filed: Apr. 22, 1996

[30] Foreign Application Priority Data

Apr. 21, 1995 [DE] Germany ............ 295 06 796.9

[51] Int. Cl.$^6$ ............ F16C 19/12; B60G 13/00
[52] U.S. Cl. ............ 384/615; 384/611; 280/668
[58] Field of Search ............ 384/590, 607, 384/609–622; 280/668

[56] References Cited

U.S. PATENT DOCUMENTS

| | | | |
|---|---|---|---|
| 4,541,744 | 9/1985 | Lederman | 384/607 |
| 4,552,467 | 11/1985 | Takei et al. | 384/615 |
| 4,618,130 | 10/1986 | Veglia | 384/611 X |
| 4,673,192 | 6/1987 | Krehan et al. | 384/615 X |
| 4,995,737 | 2/1991 | Moller et al. | 384/607 |
| 5,467,971 | 11/1995 | Hurtubise et al. | 280/668 X |

FOREIGN PATENT DOCUMENTS 2658748  6/1978  Germany.

Primary Examiner—Thomas R. Hannon
Attorney, Agent, or Firm—Ostrolenk, Faber, Gerb & Soffen, LLP

[57] ABSTRACT

A spring leg mounting and a spring cup receiver for a spring at a wheel of a motor vehicle. At one end of the spring is a spring receiver that is toward the vehicle wheel. At the other end of the spring is the apparatus of the invention. An antifriction bearing is at that other end. A plastic cap surrounds the bearing, supports the bearing ring and seals the bearing. The cap includes a first part which defines a spring receiver that receives the respective end of the spring. The spring receiver and the spring are so shaped that the spring surrounds the receiver so that the partial region supporting the bearing is arranged concentrically within the regions forming the spring receiver. A second part of the cap is U-shaped and has a cross section with arms that extend past the radial sides of the bearing. The cap parts are snap connected together. A vibration damping pad of urethane is disposed between the spring receiving cap first part and the spring.

12 Claims, 2 Drawing Sheets

5,664,892

SPRING LEG MOUNTING AND SPRING CUP RECEIVER

BACKGROUND OF THE INVENTION

The present invention relates to a spring leg mounting and spring cup receiver for a spring at a wheel of a motor vehicle.

In a chassis construction for an automotive vehicle, a "spring leg" comprises a combination of a coil spring and a telescopic shock absorber. The coil spring rests in cup shaped receivers against the shock absorber and the body of the vehicle. The outer tube of the spring leg and the part at which the wheel bearings are seated are frequently combined to form a single unit. During steering of the vehicle, this unit swings around the piston rod of the shock absorber. That rod is fastened by a rubber block to the body. In order to reduce the resistance to steering, one of the two spring pads rests in an antifriction bearing.

Federal Republic of Germany Patent 26 58 748 discloses an axial antifriction bearing for the turnable supporting of the spring pad in spring legs of motor vehicles. An antifriction bearing can be snapped together to form a structural unit by means of a plastic cap. Such spring leg mountings have proven satisfactory in actual practice.

Another development of such mountings is shown in U.S. Pat. No. 4,995,737 to the assignee hereof. In that case an encapsulated bearing is provided with several projections for securing the bearing and is snapped into the spring cup.

The problem in the prior art mountings is that it is necessary to support the bearing and the plastic cap on a supporting part for transmitting force. For this purpose, a spring cup of sheet metal is provided which must be of suitable stability. This increases weight.

SUMMARY OF THE INVENTION

The object of the present invention is to develop a spring leg mounting and a spring cup receiver of the aforementioned type to provide a simple, easily built and reliable construction which is light weight and which also permits good handling.

The invention concerns a spring leg mounting and a spring cup receiver for a spring at a wheel of a motor vehicle. At one end of the spring is a spring receiver that is toward the vehicle wheel. At the other end of the spring is the apparatus of the invention. An antifriction bearing is at that other end. A plastic cap surrounds the bearing, supports the bearing ring and seals the bearing. The cap includes a first part toward the spring and which defines a spring receiver that receives the respective end of the spring. The spring receiver and the spring are so shaped that the spring is annular and surrounds the spring receiver so that the partial region supporting the bearing is arranged concentrically within the regions forming the spring receiver. A second part of the cap is U-shaped and so cross sectioned that the arms of the U extend past the radial sides of the bearing. The cap parts are snap connected together. A vibration damping pad of urethane is disposed between the spring receiving cap first part and the spring.

Because the cap is developed at the same time as a spring receiver and because the region supporting the bearing is arranged concentrically within the spring receiver, a sheet metal spring cup receiver is superfluous. The spring leg mounting of the invention is rather self supporting and is of light weight due to its ribbed construction. A urethane pad arranged between the spring receiver cap and the spring serves not only to equalize tolerances and positions but also to damp any blows which occur.

Other objects and features of the invention are explained with reference to an embodiment shown in the drawings.

DESCRIPTION OF A PREFERRED EMBODIMENT

Figure 1:
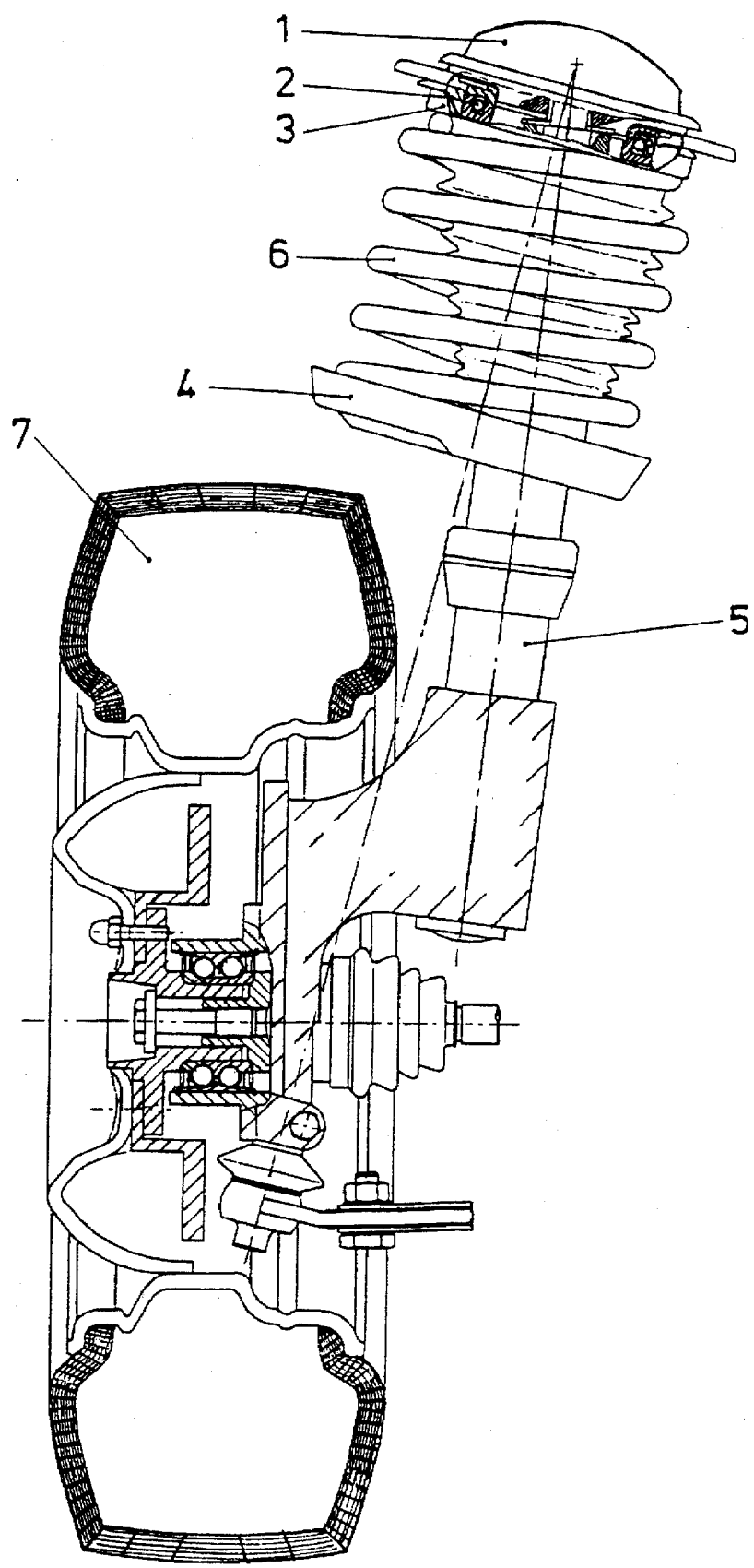
FIG. 1 shows a spring leg of a motor vehicle.

FIG. 1 shows an embodiment in which the invention is included, including a rubber block 1, a spring leg bearing 2, an upper spring receiver 3, a lower spring receiver 4, an outer spring leg tube 5, a spring 6 and the vehicle wheel 7.

Figure 2:
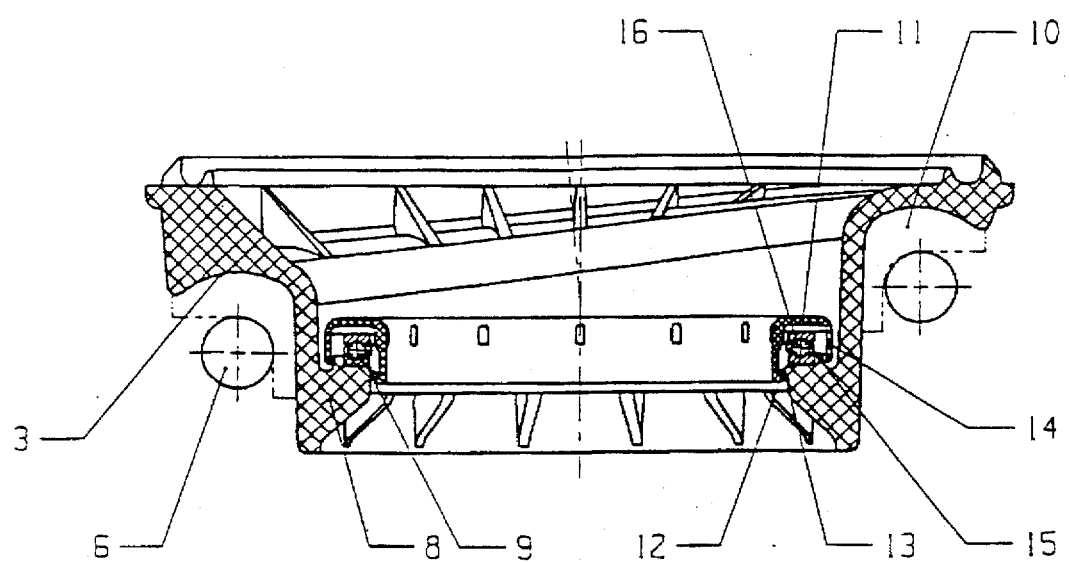
FIG. 2 shows a cross section of the spring leg mounting and spring cup receiver of the invention.

In FIG. 2, a first cap 8 is developed as the upper spring receiver 3. A partial region supporting the bearing 9 is arranged concentrically within the region forming the spring receiver. The spring is on the outside of the receiver. In this connection, the first cap 8 is developed as a self supporting part having a ribbed construction.

A pad 10 of urethane is provided between the spring 6 and the spring receiver 3 to damp vibrations. The spring leg bearing 9 is a special axial deep-groove ball bearing. Its bearing rings are produced without machining. The races are so compacted in a special process that great hardness is present on the surfaces but the disks are elastic.

The bearing rings are surrounded by first and second plastic cap parts 8 and 11 which are snapped into one another and form a structural unit that is the cap hereof. For this snap together purpose, the first cap part 8 is provided with holding tongues 12 which cooperate with projections 13 on the second cap part 11. In this connection, the other free arm 14 of the U-shaped second cap part 11 forms a slot seal with the mating part 15 of the spring receiver 3 of the first cap part.

The bearing 9 is provided with lifetime lubrication and is sealed effectively against dirt. The high elasticity as a whole assures a substantially uniform distribution of the load over the individual balls 16.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A spring leg mounting and spring cup receiver for the spring leg of a motor vehicle comprising:

an antifriction bearing which includes bearing rings and rotating bearing elements between the bearing rings;

a plastic cap surrounding the antifriction bearing and supporting the bearing rings and sealing off the bearing; the cap comprising a first part serving as a spring receiver and a second part; snap devices holding together the parts of the cap;

the cap including a spring receiver for receiving an end of the spring of the spring leg of the motor vehicle, and the spring receiver being so shaped and sized as to pass around the outside of the bearing, and the bearing is arranged concentrically within the region forming the spring receiver of the cap.

2. The apparatus of claim 1, wherein the antifriction bearing is an axial ball bearing.

3. The apparatus of claim 1, wherein the snap devices comprise tongues formed on one of the cap parts and tongue receivers on the other of the cap parts.

4. The apparatus of claim 1, wherein the cap first part is shaped for defining a sleeve about which the end of the spring is received and an abutment on which the spring rests and the bearing is surrounded by the spring passing therearound.

5. The apparatus of claim 4, further comprising a vibration damping pad disposed between the cap first part and the spring.

6. The apparatus of claim 1, further comprising a vibration damping pad disposed between the cap first part and the spring.

7. The apparatus of claim 6, wherein the vibration damping pad is comprised of urethane.

8. The apparatus of claim 1, wherein the cap first part is shaped as a self supporting structural part of ribbed construction.

9. The spring leg of claim 1, wherein the cap first part is comprised as a self supporting structural part of ribbed construction.

10. The apparatus of claim 9, wherein the second cap part is annular, and has a U-shaped cross section defining arms of the U which pass opposite radial sides of the bearing, and the snap devices snap together the first and second cap parts.

11. The apparatus of claim 10, wherein the snap devices comprise holding tongues on the U-shaped second cap part and cooperating projections for receiving the tongues on the cap first cap part.

12. The apparatus of claim 10, wherein the radially outward arm of the U-shaped second cap part has a slot seal, and the spring receiver includes a mating member cooperating with the slot seal.

* * * * *